United States Patent
Kakani

(10) Patent No.: US 10,469,999 B2
(45) Date of Patent: *Nov. 5, 2019

(54) ESTABLISHMENT OF RELIABLE MULTICAST/BROADCAST IN A WIRELESS NETWORK

(71) Applicant: Nokia Technologies Oy, Espoo (FI)

(72) Inventor: Naveen Kumar Kakani, Irving, TX (US)

(73) Assignee: NOKIA TECHNOLOGIES OY, Espoo (FI)

( * ) Notice: Subject to any disclaimer, the term of this patent is extended or adjusted under 35 U.S.C. 154(b) by 168 days.

This patent is subject to a terminal disclaimer.

(21) Appl. No.: 15/412,152

(22) Filed: Jan. 23, 2017

(65) Prior Publication Data

US 2017/0134911 A1   May 11, 2017

Related U.S. Application Data

(63) Continuation of application No. 12/531,064, filed as application No. PCT/IB2008/000561 on Mar. 10, 2008, now Pat. No. 9,602,297.

(Continued)

(51) Int. Cl.
*G06F 11/00* (2006.01)
*H04W 4/06* (2009.01)
(Continued)

(52) U.S. Cl.
CPC ............. *H04W 4/06* (2013.01); *H04L 12/189* (2013.01); *H04L 12/1863* (2013.01); *H04W 72/005* (2013.01)

(58) Field of Classification Search
CPC ..... H04W 4/06; H04W 72/005; H04L 12/189; H04L 12/1863

See application file for complete search history.

(56) References Cited

U.S. PATENT DOCUMENTS 5,664,091 A   9/1997  Keen
6,088,342 A   7/2000  Cheng et al.
(Continued)

FOREIGN PATENT DOCUMENTS

EP          1722506 A1   11/2006
WO    WO-2004/023736    3/2004
(Continued)

OTHER PUBLICATIONS

"An Overview of Reliable Multicast Transport Protocol II", IEEE Network, Jan./Feb. 2000, pp. 37-47.
(Continued)

*Primary Examiner* — Jason B Bryan
(74) *Attorney, Agent, or Firm* — Alston & Bird LLP

(57) ABSTRACT

Various example embodiments are disclosed relating to the establishment of reliable multicast/broadcast sessions in a wireless network. According to an example embodiment, an apparatus may be configured to receive, from a wireless recipient station, a request to establish a reliable multicast/broadcast session with the recipient station. The apparatus may be further configured to transmit, to the recipient station, a response to the request to establish the reliable multicast/broadcast session. The response may include one or more retransmission fields describing a retransmission of data for the requested reliable multicast/broadcast session. For example, the request may include a retransmission multicast address to be used for retransmission of data for the multicast/broadcast session.

20 Claims, 9 Drawing Sheets

Related U.S. Application Data

(60) Provisional application No. 60/894,446, filed on Mar. 12, 2007.

(51) Int. Cl.
  *H04L 12/18* (2006.01)
  *H04W 72/00* (2009.01)

(56) References Cited

U.S. PATENT DOCUMENTS

| | | | |
|---|---|---|---|
| 6,574,668 B1 | 6/2003 | Gubbi et al. | |
| 6,754,224 B1 | 6/2004 | Murphy | |
| 6,847,610 B1 | 1/2005 | Suumaki et al. | |
| 6,934,752 B1 | 8/2005 | Gubbi | |
| 7,013,157 B1 | 3/2006 | Norman et al. | |
| 7,197,038 B1 | 3/2007 | Cook | |
| 7,400,596 B1 | 7/2008 | Robertson et al. | |
| 7,447,175 B2 | 11/2008 | Shin | |
| 7,471,645 B2 | 12/2008 | Torres et al. | |
| 7,486,658 B2 | 2/2009 | Kumar | |
| 7,542,462 B1 | 6/2009 | Murphy | |
| 7,587,591 B2 | 9/2009 | Lebovitz et al. | |
| 7,720,019 B1 | 5/2010 | Farinacci et al. | |
| 7,889,732 B2* | 2/2011 | Bijwaard | H04L 12/185 370/390 |
| 7,924,835 B2 | 4/2011 | Platnic | |
| 8,451,762 B2* | 5/2013 | Liu | H04L 12/1863 370/312 |
| 8,898,320 B2* | 11/2014 | Mai | H04L 12/1836 709/229 |
| 2002/0143951 A1* | 10/2002 | Khan | H04L 12/185 709/227 |
| 2002/0150099 A1 | 10/2002 | Pung et al. | |
| 2003/0028632 A1 | 2/2003 | Davis | |
| 2003/0202506 A1 | 10/2003 | Perkins et al. | |
| 2004/0162024 A1 | 8/2004 | Wentink | |
| 2006/0013189 A1 | 1/2006 | Fujimoto | |
| 2006/0018335 A1* | 1/2006 | Koch | H04L 12/18 370/432 |
| 2006/0034247 A1 | 2/2006 | Gu et al. | |
| 2006/0048034 A1 | 3/2006 | Cho | |
| 2006/0062238 A1 | 3/2006 | Mahendran et al. | |
| 2006/0140186 A1 | 6/2006 | LoGalbo et al. | |
| 2006/0165068 A1 | 7/2006 | Dalton et al. | |
| 2007/0002858 A1* | 1/2007 | Bichot | H04L 12/1836 370/390 |
| 2007/0025325 A1 | 2/2007 | Kumar | |
| 2007/0047530 A1 | 3/2007 | Ayers et al. | |
| 2007/0064718 A1 | 3/2007 | Ekl et al. | |
| 2007/0160045 A1 | 7/2007 | Payyappilly et al. | |
| 2007/0162813 A1 | 7/2007 | Nakashima | |
| 2007/0260921 A1 | 11/2007 | Cankaya et al. | |
| 2007/0286121 A1 | 12/2007 | Kolakowski et al. | |
| 2008/0002621 A1 | 1/2008 | Ginzburg et al. | |
| 2009/0046637 A1 | 2/2009 | Kim et al. | |

FOREIGN PATENT DOCUMENTS

| | | |
|---|---|---|
| WO | WO-2007/122503 A3 | 11/2007 |
| WO | WO-2008/020731 | 2/2008 |

OTHER PUBLICATIONS

"Draft Amendment to STANDARD [for] Information Technology—Telecommunications and information exchange between Systems—Local and Metropolitan networks—Specific requirements", Part 11: Wireless LAN Medium Access Control (MAC) and Physical Layer (PHY) specifications: Enhancements for Higher Throughput, IEEE P802.11n/D0.02, Feb. 2006, 224 pages.

"Draft Amendment to Standard for Information Technology—Telecommunications and Information Exchange Between Systems—LAN/MAN Specific Requirements", Part 11: Wireless Medium Access Control (MAC) and physical layer (PHY) specifications, Amendment v: Wireless Network Management, IEEE 802.11v. D0.07, Jan. 2007, 168 pages.

"Telecommunications and information exchange between systems Local and metropolitan area networks Specific requirements", Part 11: Wireless LAN Medium Access Control (MAC) and Physical Layer (PHY)specifications, Amendment 8: Medium Access Control (MAC) Quality of Service Enhancements, IEEE Standard for Information technology, Nov. 11, 2005, pp. 63-67.

"Wireless LAN Medium Access Control (MAC) and Physical Layer (PHY) specifications: Enhancements for Higher Throughput," IEEE 802.11n.D0.01, Jan. 2006.

Boivie, R. et al., *Explicit Multicast (Xcast) Concepts and Options*, Internet Draft, No. 10 ( Jan. 1, 2007) 1-32.

Hornig C.,; "*A Standard for the Transmission of IP Datagrams over Ethernet Networks*;" Network Working Group; dated Apr. 1984; retrieved from <http://www.ietf.org/rfc/rfc0894.txt?>.

Kakani N., "Multicast Transmission in WLAN", IEEE 802.11.08, May 13, 2008, 16 pages.

Kim, Y. et al., *Tree-Based Reliable Dissemination Protocol With Differential Control*, vol. 1, IEEE Tencon (Sep. 15, 1999) 781-784.

Yoon, W. et al., *Tree-Based Reliable Multicast in Combined Fixed/Mobile IP Networks*, Local Computer Networks, IEEE (Nov. 8, 2000) 478-487.

International Search Report and Written Opinion, Received in corresponding PCT Application No. PCT/IB2008/000561. Oct. 1, 2008. 13 pages.

International Search Report and Written Opinion for corresponding Patent Cooperation Treaty International Application No. PCT/IB2007/001068, dated Oct. 21, 2008, 13 pages.

International Preliminary Report on Patentability received for corresponding Patent Cooperation Treaty International Application No. PCT/IB2007/001068, dated Nov. 27, 2008, 10 pages.

International Preliminary Report on Patentability received for corresponding Patent Cooperation Treaty Application No. PCT/IB2008/000561, dated Sep. 15, 2009, 9 pages.

Non-Final Office action received for corresponding Korean Application No. 2008-7025924 dated Jul. 21, 2010, 4 pages of Office Action, and 4 pages of translation.

Non-Final Office action received for corresponding Chinese Application No. 200780017651.X dated Apr. 20, 2011, 6 pages of Office Action, and 5 pages of translation.

Non-Final Office action received for corresponding Chinese Application No. 200780017651.X dated Aug. 9, 2011, 5 pages of Office Action, and 5 pages of translation.

Extended European Search Report received for corresponding European Patent Application No. 07734386.1, dated Nov. 3, 2011, 8 pages.

Non-Final Office action received for corresponding Chinese Application No. 200780017651.X dated Jan. 10, 2012, 6 pages of Office Action, and 7 pages of translation.

Non-Office action received for corresponding Chinese Patent Application No. 200880015816.4, dated Mar. 12, 2012.

Office Action for corresponding European Patent Application No. 07734386.1 dated Jun. 18, 2012, 4 pages.

Office Action for Chinese Application No. 200880015816.4 dated Jul. 26, 2012.

Supplementary European Search Report for Application No. EP 08 71 9269 dated Dec. 12, 2012.

Communication Pursuant to Article 94(3) for European Application No. 08 719 269.6; dated Jan. 9, 2014.

Communication Pursuant to Article 94(3) for European Application No. 08 719 269.6; dated Jul. 26, 2016.

Non-Final Office action received for corresponding U.S. Appl. No. 11/789,267, dated Aug. 5, 2010, 77 pages.

Final Office action received for corresponding U.S. Appl. No. 11/789,267, dated Feb. 2, 2011, 80 pages.

Non-Final Office action received for corresponding U.S. Appl. No. 11/789,267, dated Oct. 18, 2011, 75 pages.

Non-Final Office action received for corresponding U.S. Appl. No. 11/789,267, dated Apr. 19, 2012, 65 pages.

Final Office Action from U.S. Appl. No. 11/789,267, dated Oct. 16, 2012.

(56) References Cited

OTHER PUBLICATIONS

Office Action for corresponding U.S. Appl. No. 12/531,064, dated Aug. 14, 2012.
Office Action for corresponding U.S. Appl. No. 12/531,064, dated May 15, 2013.
Notice of Allowance for corresponding U.S. Appl. No. 12/531,064, dated Nov. 7, 2016.
Examiner's Answer to Appeal Brief for corresponding U.S. Appl. No. 12/531,064, dated Nov. 7, 2016.

* cited by examiner

ESTABLISHMENT OF RELIABLE MULTICAST/BROADCAST IN A WIRELESS NETWORK

CROSS-REFERENCE TO RELATED APPLICATIONS

This application is a continuation of U.S. application Ser. No. 12/531,064, filed Mar. 2, 2010 which is a national phase entry of International Application No. PCT/IB2008/000561 filed Mar. 10, 2008, which claims the benefit of U.S. Provisional Application No. 60/894,446, filed Mar. 12, 2007, entitled "Establishment of Reliable Multicast/Broadcast In A Wireless Network," the disclosure of which is hereby incorporated by reference.

BACKGROUND

The rapid diffusion of Wireless Local Area Network (WLAN) access and the increasing demand for WLAN coverage is driving the installation of a large number of Access Points (AP). The most common WLAN technology is described in the Institute of Electrical and Electronics Engineers IEEE 802.11 family of industry specifications, such as specifications for IEEE 802.11b, IEEE 802.11g and IEEE 802.11a. A number of different 802.11 task groups are involved in developing specifications relating to improvements to the existing 802.11 technology. The IEEE 802.11n task group has developed a High Throughput (HT) draft specification, entitled "Wireless LAN Medium Access Control (MAC) and Physical Layer (PHY) specifications: Enhancements for Higher Throughput," IEEE 802.11n.D0.01, January 2006. The IEEE 802.11v task group has developed a Wireless Network Management draft specification IEEE 802.11v D0.7 Jan. 2007.

In addition, data may be broadcast or multicast from a transmitter station to one or more recipient stations. A problem arises in wireless networks since such broadcast or multicast transmissions are typically unreliable.

SUMMARY

According to an example embodiment, a method may include receiving, from a wireless recipient station, a request to establish a reliable multicast/broadcast session with the recipient station. The method may further include transmitting, to the recipient station, a response to the request to establish the reliable multicast/broadcast session. The response may include one or more retransmission fields describing a retransmission of data for the requested reliable multicast/broadcast session.

According to another example embodiment, an apparatus may be configured to receive, from a wireless recipient station, a request to establish a reliable multicast/broadcast session with the recipient station. The apparatus may be further configured to transmit, to the recipient station, a response to the request to establish the reliable multicast/broadcast session. The response may include one or more retransmission fields describing a retransmission of data for the requested reliable multicast/broadcast session.

The details of one or more implementations are set forth in the accompanying drawings and the description below.

DETAILED DESCRIPTION

Figure 1:
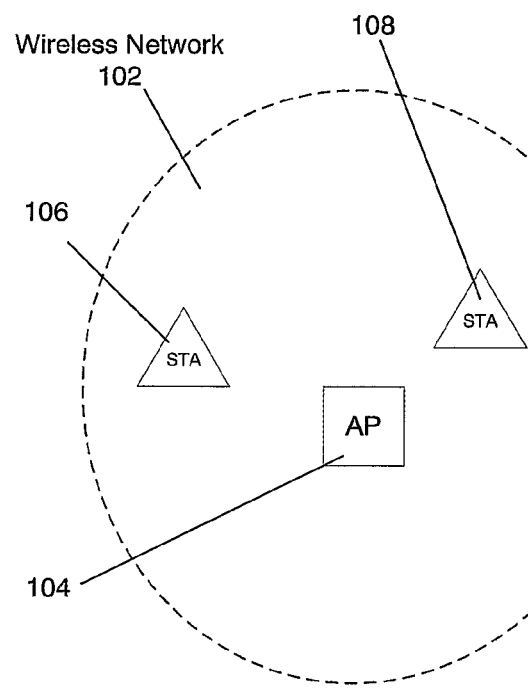
FIG. 1 is a block diagram illustrating a wireless network according to an example embodiment.

Referring to the Figures in which like numerals indicate like elements, FIG. 1 is a block diagram illustrating a wireless network according to an example embodiment. Wireless network 102 may include a number of wireless nodes or stations, such as a wireless transmitter station 104 (which may include an access point (AP) or base station), and one or more mobile stations, such as wireless recipient stations 106 and 108. While only one wireless transmitter station 104 and two wireless recipient stations 106, 108 are shown in wireless network 102, any number of wireless transmitter stations 104 and wireless recipient stations 106, 108 may be provided. Each station in network 102 (e.g., wireless recipient stations 106, 108) may be in wireless communication with the wireless transmitter station 104, and may even be in direct communication with each other. Although not shown, wireless transmitter station 104 may be coupled to a fixed network, such as a Local Area Network (LAN), Wide Area Network (WAN), the Internet, etc., and may also be coupled to other wireless networks.

The various embodiments described herein may be applicable to a wide variety of networks and technologies, such as WLAN networks (e.g., IEEE 802.11 type networks), IEEE 802.16 Wi MAX networks, cellular networks, radio networks, or other wireless networks. In another example embodiment, the various examples and embodiments may be applied, for example, to a mesh wireless network, where a plurality of mesh points (e.g., Access Points) may be coupled together via wired or wireless links. The various embodiments described herein may be applied to wireless networks, both in an infrastructure mode where a wireless transmitter station 104 such as an AP or base station may communicate with a wireless recipient station 106 (e.g., communication occurs through APs), as well as an ad-hoc mode in which wireless stations may communicate directly via a peer-to-peer network, for example.

The term "wireless node" or "node," or wireless station or the like, may include, for example, a wireless mobile device, an access point (AP), base station or other infrastructure node, a wireless personal digital assistant (PDA), a cell phone, an 802.11 WLAN phone, a wireless mesh point, or any other wireless device. These are merely a few examples of the wireless devices that may be used to implement the various embodiments described herein, and this disclosure is not limited thereto. The various embodiments herein may be applicable to so called infrastructure mode where a wireless transmitter station 104 such as a base station or AP may transmit information, as well as to ad-hoc mode.

In this example, the wireless transmitter station 104 may be configured to send multicast/broadcast frames. The wireless transmitter station 104 may, for example, transmit one or more multicast or broadcast streams to one or more wireless recipient stations 106, 108. The wireless transmitter station 104 and the wireless recipient stations 106, 108 may, for example, establish a multicast/broadcast session, wherein a multicast stream may be directed to a group of wireless recipient stations 106, 108 which may be members of a multicast group, and identified by a multicast group address.

Note, although not limited thereto, in an example embodiment, the term broadcast may refer to a transmission of a frame or message to all stations, while multicast may refer to a transmission of a frame or message to a group of stations. The term multicast may generally include a transmission to all stations or to a group or subset of stations. Thus, the term multicast may include both multicast and broadcast.

A reliable multicast/broadcast session may include a multicast/broadcast session in which one or more wireless recipient stations 106, 108 may acknowledge receipt of one or more packets or frames of the one or more multicast or broadcast streams. The one or more wireless recipient stations 106, 108 may acknowledge receipt of the one or more multicast or broadcast streams by, for example, separate acknowledgements for each received packet, or may acknowledge receipt of packets of the reliable multicast/broadcast stream using block acknowledgments, as described below. If the wireless transmitter station 104 does not receive an acknowledgment of receipt of one or more packets of a multicast or broadcast stream (also referred to as a multicast/broadcast session), then the wireless transmitter station 104 may retransmit the one or more packets of the multicast or broadcast stream (or session) to the wireless recipient station(s) 106, 108 (which one or more of such stations may not have acknowledged receipt of those packets); the retransmission may be either multicast or unicast, as described below.

According to another example embodiment, the transmitter station may employ a first multicast address (multicast address) for new or original data (or packets), and a second multicast address (a retransmission multicast address) for retransmission data or retransmission packets. According to an example embodiment, the use of a multicast address for new packets of the multicast/broadcast stream or session and a retransmission multicast address for retransmission of packets may allow the transmitter station to retransmit packets to one or more recipient stations (via the retransmission multicast address) without necessarily sending these retransmission packets to legacy devices (or devices that may not be sending acknowledgements or not expecting retransmission of data). The retransmission of packets for multicast/broadcast streams may create an issue of duplicate packets at certain wireless recipient stations. In some cases, the use of a separate retransmission multicast address may allow such retransmissions to be targeted to specific wireless recipient stations that are compatible with such retransmissions, for example.

Figure 2:
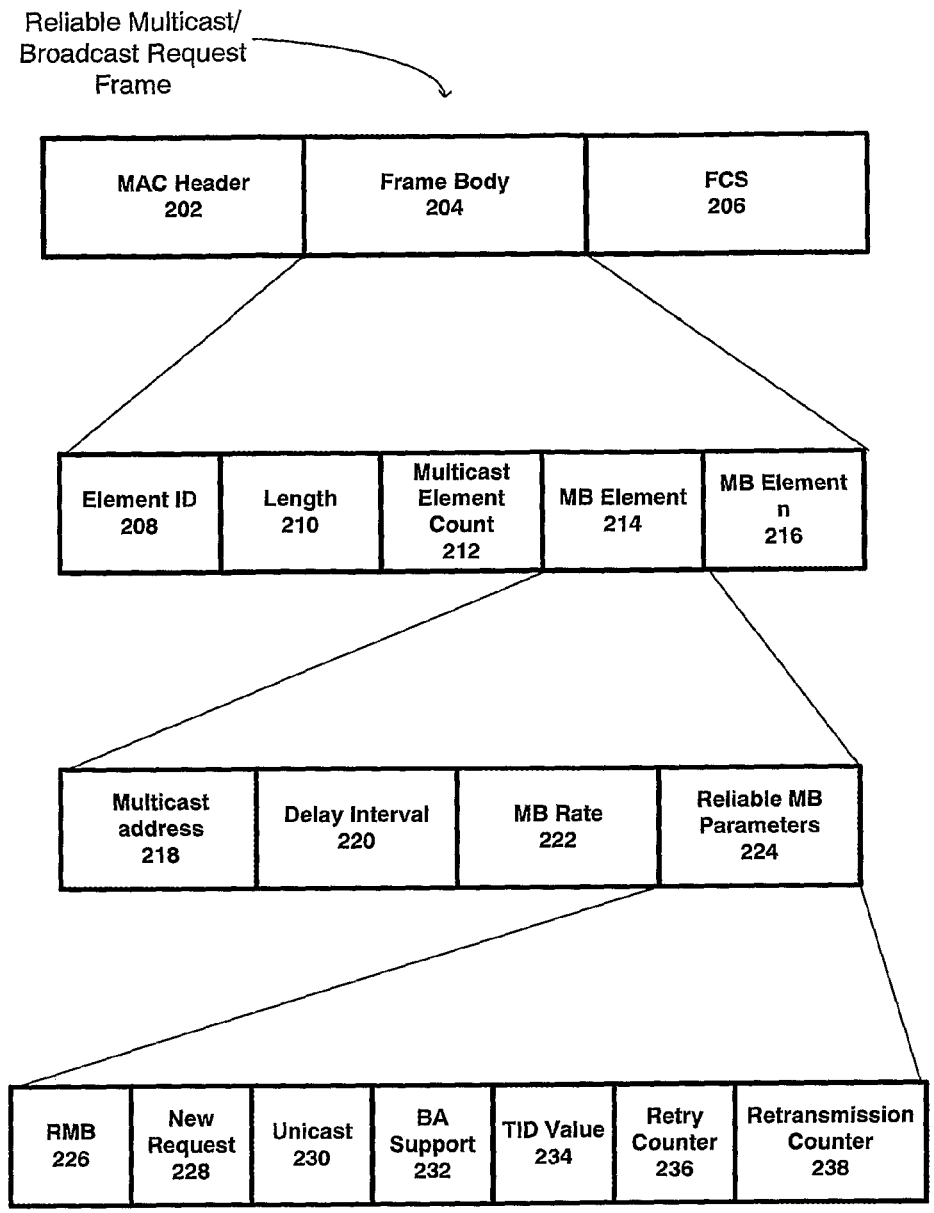
FIG. 2 is a block diagram illustrating a reliable multicast/broadcast request frame according to an example embodiment.

FIG. 2 is an example embodiment of a reliable multicast/broadcast request frame 200. The reliable multicast/broadcast request frame 200 may be transmitted, for example, by a wireless recipient station 106, such as a wireless personal digital assistant (PDA), a cell phone, an 802.11 WLAN phone, a wireless mesh point, or any other wireless device to a wireless transmitter station 104. The reliable multicast/broadcast request frame 200 may include a request by the wireless recipient station 106 to establish (or receive) a reliable multicast/broadcast session with the wireless transmitter station 104. For example, the request frame 200 may be a request to establish or receive data for an existing reliable multicast/broadcast stream or session. The reliable multicast/broadcast session (or stream) may be transmitted to one or more wireless recipient stations, for example.

The reliable multicast/broadcast request frame 200 may include a MAC (or Media Access Control) header 202, which may include a recipient station address, a transmitter station address, and other fields. The reliable multicast/broadcast request frame 200 may also include a frame body 204 and a frame check sequence 206.

The frame body 204 may include a number of fields, including an element ID field 208, which may indicate a request for participation in a multicast/broadcast session, a length field 210, which may indicate length of the reliable multicast/broadcast request frame 200, a multicast element count field 212, which may indicate a number of multicast/broadcast element fields (214, 216), a multicast/broadcast element field 214, and any additional number, such as n−1, of additional multicast/broadcast element fields n 216. The additional multicast/broadcast element fields n 216 may indicate desired parameters for participation in each of multiple multicast/broadcast sessions.

The multicast/broadcast element field 214 may include a multicast address field 218, which may indicate a multicast address to which new data are to be sent for the multicast/broadcast session (or the multicast address of the requested reliable multicast/broadcast session), a delay interval field 220, which may indicate a frequency or time interval for transmission of new data, and which may be a multiple of a beacon frame, a multicast/broadcast rate field 222, which may indicate a data rate for the multicast/broadcast session, such as one bit per symbol or two bits per symbol, and a reliable multicast/broadcast parameters field 224.

The reliable multicast/broadcast parameters field 224 may include a reliable multicast/broadcast field 226, which may indicate the presence of other fields in the request relating to reliable multicast/broadcast, such as reliable multicast/broadcast parameters in the reliable multicast/broadcast parameters field 224. For example, the reliable multicast/broadcast parameters field 226 may include a bit set to "1" to indicate that the fields following the reliable multicast/broadcast parameters field 226 have a specific meaning, or the reliable multicast/broadcast parameters field 226 may include a bit set to "0" to indicate that the fields following the reliable multicast/broadcast parameters field 226 are reserved (or not used), for example.

The reliable multicast/broadcast parameters field 224 may also include a new request field 228 which may indicate whether the reliable multicast/broadcast request frame 200 is a new request or a request frame sent in response to receiving parameters from the wireless transmitter station 104. For example, the new request field 228 may include a bit set to "1" to indicate that the reliable multicast/broadcast request frame 200 is a new request for a reliable multicast/broadcast session, or may include a bit set to "0" to indicate that the reliable multicast/broadcast request frame 200 was sent in response to receiving parameters from the wireless transmitter station 104 such as those included in a reliable multicast/broadcast response frame 300 (described with reference to FIG. 3), for example.

The reliable multicast/broadcast parameters field 224 may include a unicast field 230, which may indicate a request to receive data associated with the reliable multicast/broadcast session as unicast data. For example, the unicast field 224 may include a bit set to "1" to indicate a request for the wireless transmitter station 104 to convert or copy multicast/broadcast stream data to a unicast data addressed to the wireless recipient station 106 which transmitted the reliable multicast/broadcast request frame 200. In this example, the bit set to "1" may also indicate that the fields following the unicast field 230 may be ignored. In this example, the unicast field 224 may alternatively include the bit set to "0" to indicate that unicast transmission (or conversion of multicast/broadcast session to a unicast data stream to this recipient station) is not requested, and that the fields following the unicast field 224 are valid. In the event that a recipient station may request to receive multicast broadcast stream data as unicast data and the transmitter station subsequently complies with this request, the transmitter station may also continue to transmit the multicast/broadcast stream data or session to one or more other recipient stations as a multicast/broadcast stream or session.

The reliable multicast/broadcast parameters field 224 may also include a block acknowledgment support field 232, which may indicate whether the wireless recipient station 106 requires the wireless transmitter station 104 establish block acknowledgment for the reliable multicast/broadcast session. For example, the block acknowledgment support field 232 may include a bit set to "1" to indicate that the wireless recipient station 106 requires block acknowledgment to be established (or used) for the reliable multicast/broadcast session, or may include a bit set to "0" to indicate that block acknowledgment may be established at the discretion of the wireless transmitter station 104.

The reliable multicast/broadcast parameters field 224 may also include a traffic ID value field 234 to indicate a traffic ID for the wireless recipient station 106. The traffic ID value field 234 may indicate a traffic ID for the wireless recipient station 106 for each reliable multicast/broadcast session. For example, where the reliable multicast/broadcast request frame 200 includes one or more additional multicast/broadcast element fields n 216, each corresponding to an additional reliable multicast/broadcast session in which the wireless recipient station is requesting to participate, each additional multicast/broadcast element field n 216 may include a traffic ID value field 234 indicating a traffic ID for the wireless recipient station 106 for that particular reliable multicast/broadcast session.

The reliable multicast/broadcast parameters field 224 may also include a retry counter field 236 which may indicate or request a number of times that the wireless transmitter device 104 should retransmit data that was not received by the wireless recipient station 106 before giving up (or request a maximum number of retries for the retransmission of data for the requested reliable multicast/broadcast session). In example embodiments, the retry counter field 236 may indicate a maximum number of retransmissions, or may indicate a maximum time limit after which the wireless transmitter station 104 should stop retransmitting the data that was not received.

The reliable multicast/broadcast parameters field 224 may also include a retransmission counter field 238, which may indicate a frequency or period (or delivery interval) for retransmission of the data that were not received by the wireless recipient station 106. For example, the retransmission counter field 238 may indicate how often, such as once every two-hundred milliseconds or once every two-thousand milliseconds, the data should be retransmitted, or the retransmission counter field 238 may indicate how often the data should be retransmitted as a multiple of a beacon frame period, or other reference.

Other fields may be included in the frame body 204, multicast/broadcast element frame 214, and/or in the reliable multicast/broadcast parameters field 224.

Figure 3:
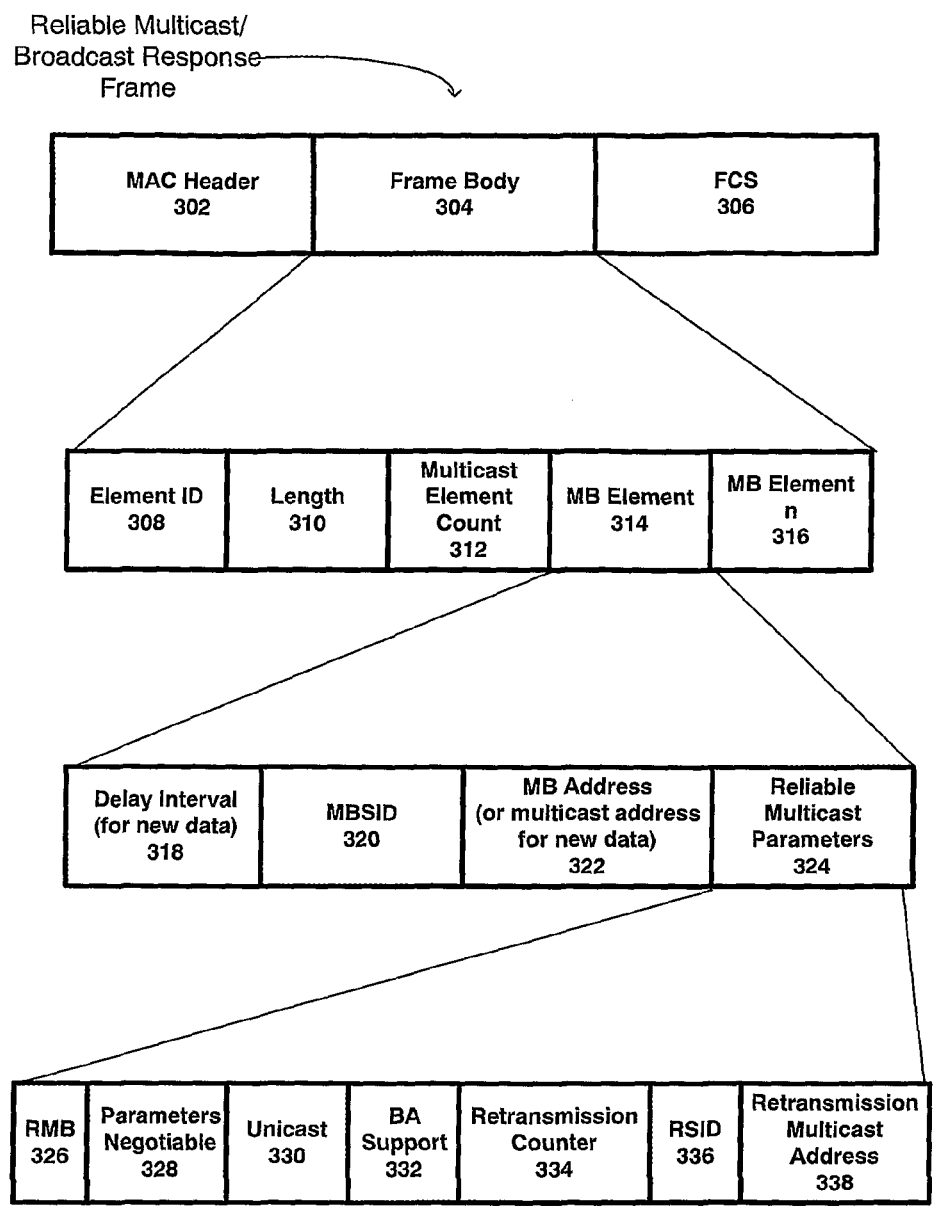
FIG. 3 is a block diagram illustrating a reliable multicast/broadcast response frame according to an example embodiment.

FIG. 3 is a block diagram of a reliable multicast/broadcast response frame 300 according to an example embodiment. The reliable multicast/broadcast response frame 300 may be sent to the recipient station 106 in response to the reliable multicast/broadcast request frame 200 requesting to establish the reliable multicast/broadcast session.

The reliable multicast/broadcast response frame 300 may include a MAC header 302, which may include a recipient station address, a transmitter station address, and other fields. The reliable multicast/broadcast response frame 300 may also include a frame body 304 and a frame check sequence 306.

The frame body 204 may include a number of fields, including an element ID field 308, which may indicate a response to the request for participation in the multicast/broadcast session, such as to accept or modify the request, a length field 310, which may indicate length of the reliable multicast/broadcast response frame 300, a multicast element count field 312, which may indicate a number of multicast/broadcast element fields (314, 316), a multicast/broadcast element field 314, and any additional number, such as n−1, of additional multicast/broadcast element fields n 316. The additional multicast/broadcast element fields n 316 may indicate parameters for participation in each of multiple multicast/broadcast sessions with the same wireless recipient station 106.

The multicast/broadcast element field 314 may include a number of fields. Some of the fields included in the multicast/broadcast element field 314 may include a delay interval field 318, which may indicate the same frequency or time interval for transmission of new data as was proposed by the wireless recipient station 106 in the delay interval field 220, or may propose a new frequency or time interval. Thus, the delivery interval for new data may be negotiated between a transmitter station and a recipient station, for example. A number of other parameters may be negotiated as well, between the transmitter station and recipient station.

The multicast/broadcast element field 314 may also include a multicast/broadcast session ID field 320, which may indicate a multicast/broadcast session ID for the particular multicast/broadcast session, where, for example, the multicast/broadcast session ID may be transmitted by the wireless transmitter station 104 to announce or indicate transmission of data for a multicast/broadcast stream. Also, a multicast/broadcast address field 322 may be provided, which may confirm that the multicast/broadcast address indicated in the request by the multicast address field 218 is associated with the particular multicast/broadcast session. And, a reliable multicast parameters field 324 may be provided.

The reliable multicast parameters field 324 may include a reliable multicast/broadcast field 326, which may indicate the presence of reliable multicast/broadcast parameters in the reliable multicast/broadcast parameters field 324. For example, the reliable multicast/broadcast field 326 may include a bit set to "1" indicating that the fields following the reliable multicast/broadcast field 326 have specific meanings, or the reliable multicast/broadcast field 326 may include a bit set to "0" indicating that the fields following the reliable multicast/broadcast field 326 are reserved.

The reliable multicast parameters field 324 may also include a parameters negotiable field 328, which may indicate whether the wireless transmitter station 104 is willing to negotiate the retransmission of data with the wireless recipient station 106 or one or more parameters relating to retransmission of data. For example, the parameters negotiable field 328 may include a bit set to "1" indicating that the wireless transmitter station 104 is willing to negotiate the retransmission parameters, such as whether the wireless transmitter station 104 may be willing to convert or copy multicast/broadcast stream data to unicast data addressed to the wireless recipient station 106, block acknowledgment, or the number of times or the time over which the wireless transmission station 104 may retransmit data before giving up, a retransmission delivery interval, etc. Or, for example, the parameters negotiable field 328 may include a bit set to "0" to indicate that the wireless transmitter station 104 is not willing to negotiate the retransmission of data with the wireless recipient station 106 or any parameters relating to retransmission of data, and that the wireless recipient station 106 must (or should typically) accept the parameters included in the reliable multicast/broadcast response frame 300, or not participate in a reliable multicast/broadcast session, for example.

The reliable multicast parameters field 324 may also include a unicast field 330, which may indicate whether the data for the reliable multicast/broadcast session will be transmitted to the wireless recipient station 106 as unicast data (as requested by recipient station). For example, the unicast field 330 may include a bit set to "1" indicating that the data for the reliable multicast/broadcast session will be transmitted to the wireless recipient station 106 as unicast data, and that the fields following the unicast field 330 are reserved.

The reliable multicast parameters field 324 may also include a block acknowledgment support field 332 indicating a request for the wireless recipient station 106 to use block acknowledgments for the requested reliable multicast/broadcast session. For example, the block acknowledgment support field 332 may include a bit set to "1" indicating that the wireless transmitter station 104 will set up block acknowledgment for the reliable multicast/broadcast session, or the block acknowledgment support field 332 may include a bit set to "0" to indicate that the wireless transmitter station 104 will not set up block acknowledgment for the reliable multicast/broadcast session.

The reliable multicast parameters field 324 may also include a retransmission counter field 334 indicating a delivery interval for the retransmission of data for the requested reliable multicast/broadcast session. For example, the retransmission counter field 334 may indicate how often, such as once every two-hundred milliseconds or once every two-thousand milliseconds, the data will be retransmitted, or the retransmission counter field 334 may indicate how often the data will be retransmitted as a multiple of the beacon frame period. The value provided in the retransmission counter may be the same or different than the delivery interval requested or proposed by the recipient station for example (e.g., in the retransmission counter 238 of the request frame). Thus, the retransmission delivery interval may, for example, be negotiated between the transmitter station and the recipient station.

The reliable multicast parameters field 324 may also include a retransmission stream identifier (RSID) field 336, which may indicate an RSID. The RSID may be included in a beacon frame transmitted by the wireless transmitter station 104 to indicate an expected retransmission of data for the requested multicast/broadcast session or stream, which may allow recipient stations to wake at the appropriate time to receive the retransmission data for the multicast/broadcast session or stream, for example. For example, the RSID may be transmitted in the transmitter station's beacon signal (e.g., to indicate anticipated retransmission of data for the stream) rather than using the actual retransmission multicast address for the reliable multicast/broadcast stream in the beacon, since the RSID may be smaller, e.g., one byte as compared to multiple bytes for the retransmission multicast address.

The reliable multicast parameters field 324 may also include a retransmission multicast address field 338 which may indicate a retransmission address to be used for the retransmission of data for the requested reliable multicast/broadcast session. The retransmission multicast address field 338 may, for example, describe a retransmission multicast address to be used for retransmission of data to the recipient station 106 for the reliable multicast/broadcast session. The retransmission multicast address described in the retransmission multicast address field 338 may be the same or different from the multicast/broadcast address described in the multicast/broadcast address field 322 and the multicast address field 218, according to example embodiments.

In an example embodiment, a same address may be used for both new (original) data transmission and retransmissions. This arrangement may be used, for example, where all nodes or recipient stations in the network support reliable delivery or retransmissions, or if the transmitter station (e.g., BS, AP) does not allow a wireless recipient node to join the session that does not support retransmission, although it may be used in other situations as well. Also, in an example embodiment, the reliable multicast parameters field 324 may include a field to indicate if the transmitter would retransmit the data if all or (one or more) of the recipients who need reliable multicast/broadcast session haven't received the data (e.g., acknowledgement for such data not received by transmitter station for one or more recipient stations).

According to an example embodiment, the use of a multicast address for transmission of new (or original) packets of the multicast/broadcast stream or session and a retransmission multicast address for retransmission of packets for the stream may allow the transmitter station to retransmit packets to one or more recipient stations (via the retransmission multicast address) without necessarily sending these retransmission packets to legacy devices (or to devices that may not be sending acknowledgements or may not be expecting retransmission of data). For example, the retransmission of packets for multicast/broadcast streams may create unexpected duplicate packets at some wireless recipient stations. Thus, in some cases, the use of a separate retransmission multicast address may allow such retransmissions to be targeted to specific wireless recipient stations that are compatible with such retransmissions or that have requested such retransmissions or have requested reliable multicast/broadcast stream. The use of a retransmission multicast address may, for example, also avoid sending retransmissions or duplicate packets to other stations that may not be expecting such duplicate packets and/or may not have requested reliable delivery of the multicast/broadcast session or stream.

Alternatively, the new or original packets of the multicast/broadcast stream may be sent using a multicast address (as a multicast stream or session), while retransmissions may be transmitted as unicast data or packets which may be addressed to specific recipient stations, e.g., based on failure of the transmitter station to receive acknowledgements from such specific recipient stations for such retransmitted packets.

Figure 4:
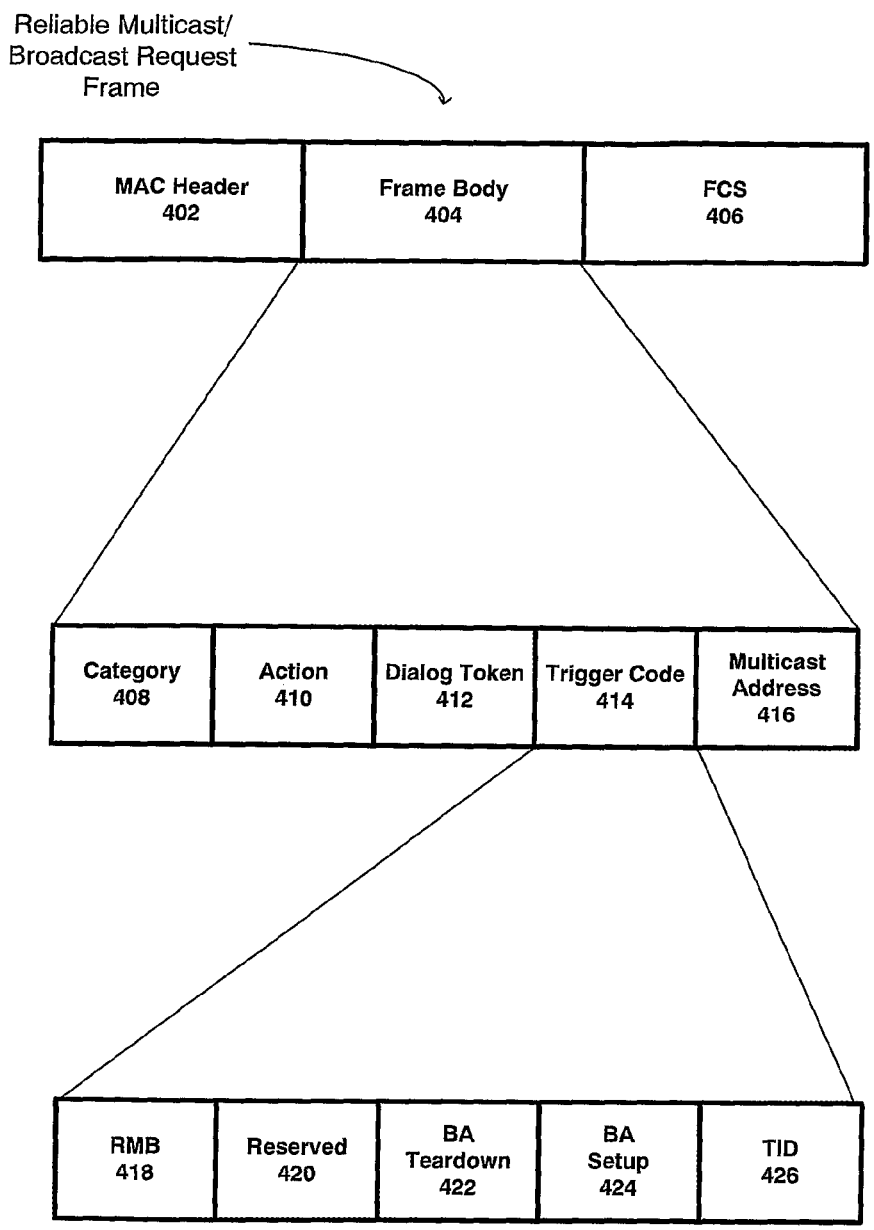
FIG. 4 is a block diagram illustrating a reliable multicast/broadcast request frame according to an alternative example embodiment.

FIG. 4 is a block diagram of a reliable multicast/broadcast request frame 400 according to another example embodiment. The reliable multicast/broadcast request frame 400 may include a MAC header 402, which may include a recipient station address a transmitter station address, and other fields. The reliable multicast/broadcast request frame 400 may also include a frame body 404 and a frame check sequence 406.

The frame body 404 may include a number of fields, such as a category field 408, which may be set to a value indicating management or control frame, an action field 410, which may be set to a value indicating a request for multicast/broadcast session (for example), a dialog token field 412, which may be repeated in the response to the request to confirm the request that has been responded to, a trigger code field 414, and a multicast address field 416, which may indicate a multicast address associated with a multicast group to which new data are to be sent (or addressed) for the multicast/broadcast session, for example.

The trigger code field 414 may include a number of fields, and may include a reliable multicast/broadcast field 418, which may indicate a request to participate in a multicast/broadcast session. In an example embodiment, different values for reliable multicast/broadcast (RMB) field 418 may indicate whether the participation in the multicast/broadcast session is being requested as reliable or non-reliable (unreliable). For example, the RMB field 418 may be set to:

Zero "0"—signals participation in the multicast/broadcast data session as indicated or identified by the multicast address 416 (e.g., may signal participation in the session as unreliable (or non-reliable) session, such as where the recipient station will not provide acknowledgements to transmitter station for received packets and the transmitter station will not retransmit packets to the receiver station, as an example).

One "1"—signals participation in the multicast/broadcast session and requests reliable session (e.g., where recipient station may provide acknowledgements to transmitter station for received packets for the session, such as via block acknowledgements, and transmitter station may retransmit packets for which no acknowledgement was received from a recipient station). The TID (Traffic ID) may indicate an identifier that can uniquely identify a specific data session between the transmitter station and recipient station.

The trigger code field 414 may include a reserved field 420 according to an example embodiment.

The trigger code field 414 may also include a block acknowledgment teardown field 422 indicating a request to discontinue block acknowledgment for the multicast/broadcast session. For example, the block acknowledgment teardown field 422 may be set to "1" to indicate a request to discontinue block acknowledgment. Or, the block acknowledgment teardown field 422 may include a bit set to "0" to not indicate a request to discontinue block acknowledgment.

In an example embodiment, block acknowledgements, for example, may allow a recipient station to acknowledge receipt of multiple packets (or a block of packets) using one acknowledgement. For example, a block acknowledgement may be sent with a sequence number to acknowledge receipt of all packets up through the indicated sequence number. Thus, although not required, the use of block acknowledgements may be a more efficient way to provide acknowledgements, e.g., as compared to the use of an individual acknowledgement for each packet.

The trigger code field 414 may also include a block acknowledgment setup field 424 indicating a request to begin block acknowledgment for the multicast/broadcast session. For example, the block acknowledgment setup field 424 may include a bit set to "1" to indicate a request to begin block acknowledgment. Or, the block acknowledgment setup field 424 may include a bit set to "0" to not indicate a request to begin block acknowledgment.

The trigger code field 414 may also include a traffic ID field 426 to indicate a traffic ID for the wireless recipient station 106. The traffic ID field 426 may indicate a traffic ID for the wireless recipient station 106 for each reliable multicast/broadcast session the wireless recipient station 106 is participating in, for example.

Figure 5:
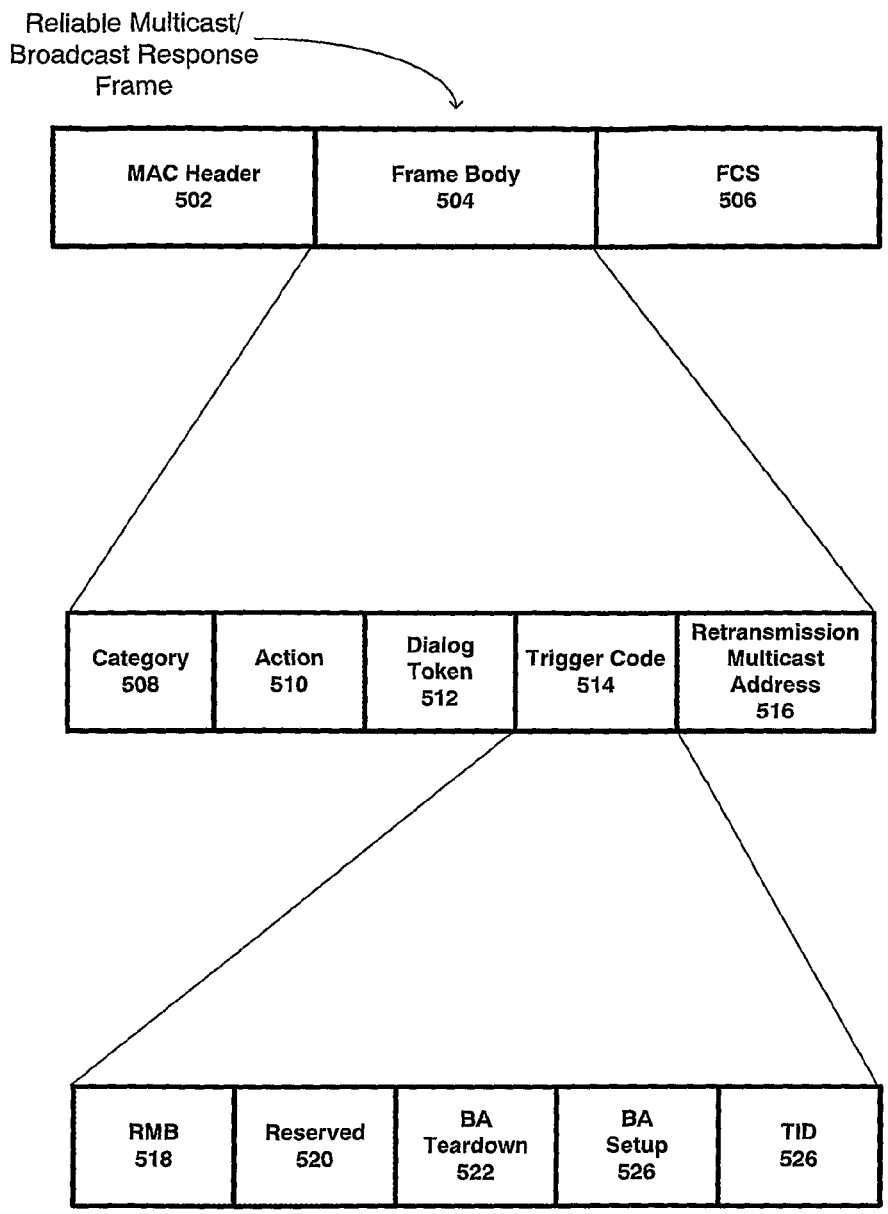
FIG. 5 is a block diagram illustrating a reliable multicast/broadcast response frame according to an alternative example embodiment.

FIG. 5 is a block diagram of a reliable multicast/broadcast response frame 500 according to another example embodiment. The reliable multicast/broadcast response frame 500 may include a MAC header 502, which may include a recipient station address, a transmitter station address, and other fields. The reliable multicast/broadcast response frame 500 may also include a frame body 504 and a frame check sequence 506.

The frame body field 504 may include a number of fields, such as a category field 508, which may be set to a value indicating control or management frame or other category an action field 510, which may be set to a value indicating a response to the request for multicast/broadcast transmission session, a dialog token field 512, which may be set to a same value as the dialog token field 412 (in the corresponding request) and may be used to identify the reliable multicast/broadcast request frame 400 that has been responded to, a trigger code field 514, and a retransmission multicast address field 516. The retransmission multicast address may indicate a multicast address to which retransmissions will be sent for the reliable multicast/broadcast session, for example.

The trigger code field 514 may include a number of fields, and may include a reliable multicast/broadcast (RMB) field 518, which may indicate an acknowledgment of participation in the reliable multicast/broadcast session. In an example embodiment, the RMB field may set to:

Zero "0"—Acknowledging the requestor's participation in a data session as identified by the multicast address field (e.g., as indicated by multicast address 416 in request). This value ("0") for RMB may, for example, acknowledge requestor's participation in the multicast/broadcast session as an unreliable (or non-reliable) delivery or session (e.g., no acknowledgements and no retransmissions).

One "1" Acknowledging the requestor's participation in the session as a reliable delivery or session (e.g., with use of acknowledgements and/or retransmissions). The TID field 526 may indicate the identifier that may uniquely identify the specific data session between transmitter and recipient stations, and the retransmission multicast address 516 is used to indicate an address for retransmissions (e.g., retransmitted packets) for this multicast/broadcast session.

The trigger code field 514 may include a reserved field 520 according to an example embodiment.

The trigger code field 514 may also include a block acknowledgment teardown field 522 indicating a request to discontinue block acknowledgment for the multicast/broadcast session. For example, the block acknowledgment teardown field 422 may include a bit set to "1" to indicate a request to discontinue block acknowledgment. Or, the block acknowledgment teardown field 522 may include a bit set to "0" to not indicate a request to discontinue block acknowledgment.

The trigger code field 514 may also include a block acknowledgment setup field 524 indicating a request to begin block acknowledgment for the multicast/broadcast session. For example, the block acknowledgment setup field 524 may include a bit set to "1" to indicate a request to begin block acknowledgment. Or, the block acknowledgment setup field 524 may include a bit set to "0" to not indicate a request to begin block acknowledgment.

The trigger code field 514 may also include a traffic ID field 526 to confirm a traffic ID for the wireless recipient station 106. The traffic ID field 526 may indicate a traffic ID for the wireless recipient station 106 for each reliable multicast/broadcast session the wireless recipient station 106 is participating in.

The recipient can send a request to negotiate the retransmission interval (or retransmission delivery interval) for retransmitted data using the existing messages or existing broadcast/multicast communication messages, either before the ADDBA or after the ADDBA setup from the transmitter. This is merely an example embodiment, and other embodiments may be used.

Figure 6:
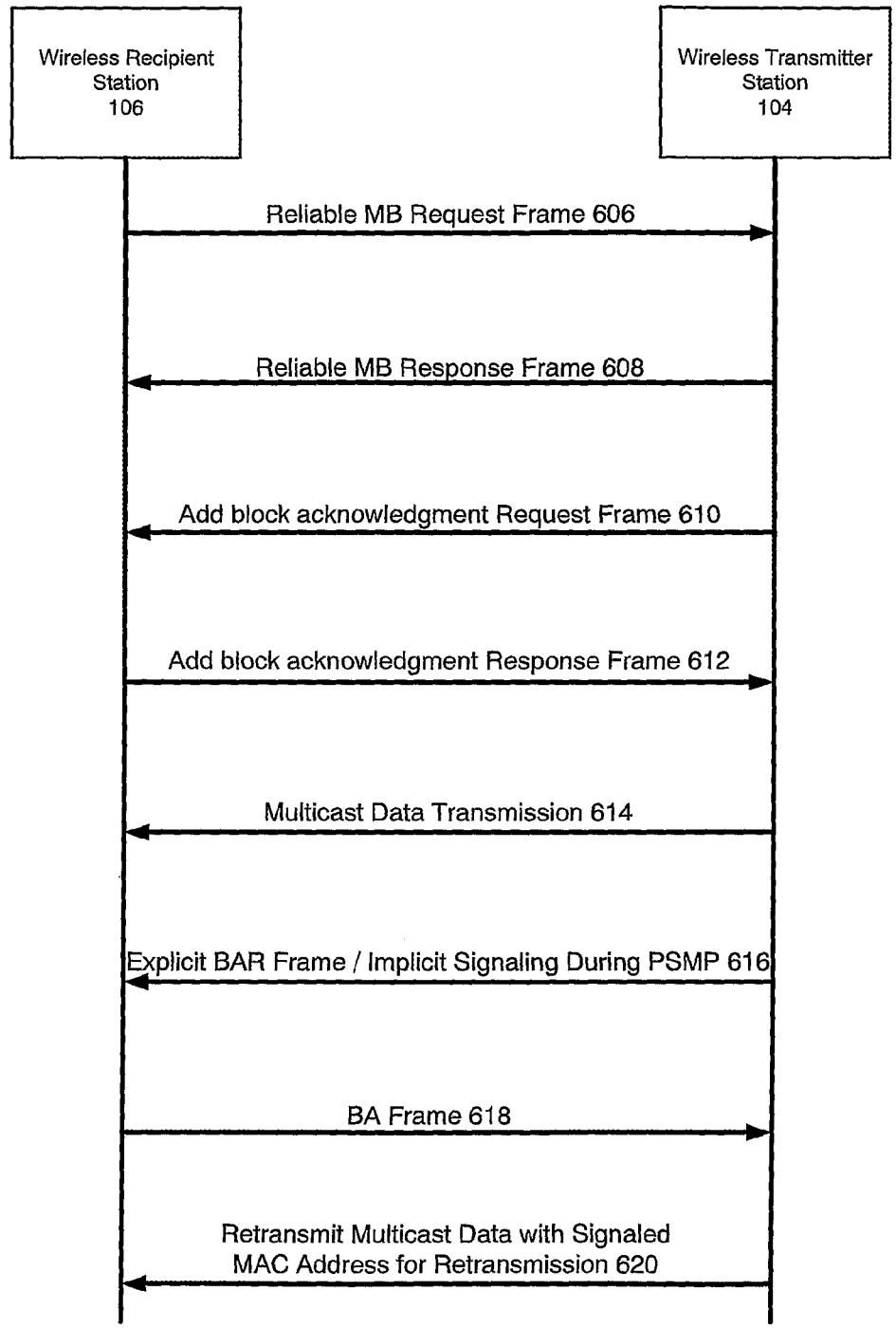
FIG. 6 is a timing diagram illustrating operation according to an example embodiment.

FIG. 6 is a timing diagram illustrating operation according to an example embodiment. Messages may be sent between the wireless recipient station 106 and the wireless transmitter station 104 via an air interface. For example, the wireless recipient station 106 may send the wireless transmitter station 104 a reliable multicast/broadcast request frame 606. The reliable multicast/broadcast request frame 606 may have a format similar to either of the frames described with reference to FIG. 2 or 4, as examples.

The wireless transmitter station 104 may respond to receiving the reliable multicast/broadcast request frame 606 by sending a reliable multicast/broadcast response frame 608 to the wireless recipient station 106. The reliable multicast/broadcast response frame may have a format similar to either of the frames described with reference to FIG. 3 or 5, as examples.

The wireless transmitter station 104 may send the wireless recipient station 106 an add block acknowledgment request frame 610 to add (or request) the use of block acknowledgements for the reliable multicast/broadcast session. The add block acknowledgment request frame may include, for example, a stream or traffic identifier (TID) associated with the wireless recipient station 106 for the multicast stream, multicast group address information which may include the multicast group address for the multicast stream, or a portion or a derivation or a hash of the multicast group address, for example. The add block acknowledgment request frame 610 may also include an address of the wireless transmitter station 104 that is transmitting the message, such as a MAC address of the wireless transmitter station 104, for example.

The wireless recipient station 106 may generate a mapping or association between the TID, the multicast stream (or multicast group address information), and the address (e.g., MAC address) of the wireless transmitter station 104. In this manner, by receiving the TID within the add block acknowledgment request frame 610, a reliable multicast transmission may be facilitated or assisted. For example, a reliable multicast transmission may be facilitated or assisted because the wireless transmitter station 104 may be able to match received acknowledgements to specific multicast streams and wireless recipient stations 106, 108 based on this mapping between TID and the recipient station address and multicast group address information.

The wireless recipient station 106 may send an add block acknowledgment response frame 612 to the wireless transmitter station 104. The add block acknowledgment response frame 612 may confirm that the wireless recipient station 106 will be sending block acknowledgments to the wireless transmitter station 104 during the reliable multicast/broadcast session.

The wireless transmitter station 104 may send one or more multicast data transmissions 614 to the wireless recipient station(s) 106, 108. For example, the wireless transmitter station 104 may transmit data of the multicast/broadcast session using a first multicast address to one or more stations including the wireless recipient station(s) 106, 108. The wireless transmitter station 104 may transmit one or multiple data frames using the first multicast address.

To facilitate block acknowledgment of receipt of the one or more multicast data frames, the wireless recipient station 106 may determine a starting sequence number for its acknowledgment based upon a sequence number of the one or more multicast data transmissions 614 received after sending the add block acknowledgment response frame 612. In an example embodiment, the wireless recipient station 106 may set its starting sequence number of its block acknowledgment to the sequence number of the first multicast data transmission received after sending the add block acknowledgment response frame 612.

The wireless transmitter station 104 may send an explicit block acknowledgment frame or implicit signalling during power save multi poll 616 to the wireless recipient station 106. The explicit block acknowledgment frame or implicit signalling during power save multi poll 616 may prompt the wireless recipient station to send a block acknowledgment frame 618 to the wireless transmitter station 104.

The block acknowledgment frame 618 may include a TID associated with the recipient station for the multicast/broadcast stream, a starting sequence number of the one or more multicast data transmissions 614, and an indication of which of a plurality of multicast data transmissions 614 were received. For example, the block acknowledgment frame 618 may include a block acknowledgment bitmap, having a bit indicating, for each of the plurality of multicast data transmissions 614 starting with the starting sequence number, whether the data frame was received (e.g., a "1" acknowledging receipt, or a "0" not acknowledging receipt).

Each wireless recipient station 106, 108 that is receiving the multicast data transmission(s) 614 may perform a block acknowledgement set up for multicast (including frames 608 and 6122) to allow reliable transmission from the wireless transmitter station 104 at a different point or time during the multicast data transmission. Therefore, depending on timing of when each wireless recipient station 106, 108 performs a block acknowledgement set up for multicast, each wireless recipient station 106, 108 may independently determine a starting sequence number for its acknowledgement, which may be different from the starting sequence numbers used by other wireless recipient stations 106, 108.

After sending the block acknowledgement 618, the wireless recipient station 106 may, for example, update its starting sequence number, to be used for the next block acknowledgement frame 618, to the sequence number of the highest or last data frame acknowledged.

The wireless transmitter station 104 may receive block acknowledgements from multiple wireless recipient stations 106, 108. The wireless transmitter station 104 may identify the wireless recipient station 106 and the multicast data transmissions 614 for which frames are being acknowledged by the block acknowledgement frame 618, based upon the TID in the block acknowledgement frame 618 and the mapping, for example.

After determining which multicast data transmissions 614 have not been acknowledged and by which wireless recipient stations 106, 108, the wireless transmitter station 104 may retransmit the multicast data with signaled MAC addresses for retransmission 620 to wireless recipient station (s) 106, 108, e.g., either as a unicast frame or a multicast frame. Retransmitted data frames may be sent as unicast frames since the wireless transmitter station 104 may obtain or determine the multicast stream and the MAC address or other address of the wireless recipient station 106 based on the TID in the acknowledgement and the mapping, for example. This may allow a reliable multicast stream via acknowledgements and retransmission via unicast data frames to specific multicast stream wireless recipient stations 106, 108 that did not receive the multicast data transmission 614, for example.

Alternatively, for example, where multiple wireless recipient stations 106, 108 may not have received a specific multicast data transmission (e.g., a timeout occurs before acknowledgement is received for such frame for a plurality of wireless recipient stations 106, 108), the wireless transmitter station 104 may retransmit such multicast data transmission as a multicast data frame addressed to the multicast address. These are merely two examples of how reliable transmission for multicast/broadcast may be used, and the embodiments are not limited to these examples.

According to an example embodiment, a wireless recipient station may transmit acknowledgements to the transmitter station without being requested. In such case, each (or all) of the recipient stations may acknowledge all received packets for the session, which may generate a large amount of traffic or even create some congestion due to increase in traffic from the acknowledgements. Thus, in other embodiments, one or more of the recipient stations may transmit acknowledgements only upon request from the transmitter station. The request for acknowledgements may be either an explicit request (or separate) request sent from the transmitter station sent to one or more (or all) recipient stations.

The request for acknowledgement may alternatively be an implicit request, e.g., which may be a field or bit set in a data packet from the transmitter station indicating to the recipient station that acknowledgement should be provided for this packet, for example. Therefore, the transmitter station may request all recipient stations, or a subset of the recipient stations to provide acknowledgements for a packet or all packets. The transmitter station may make decisions or determinations to retransmit a packet (e.g., multicast retransmission using retransmission multicast address) based on the acknowledgements received (or not received) from this subset of the participating recipient stations. For example, the transmitter station may request two of the seven recipient stations to provide acknowledgements, and may retransmit a packet for the session if one or both of the two stations do not acknowledge receipt of the frame. Or, the transmitter station may request acknowledgements from a subset or all stations, and may retransmit only if there is a failure to receive the requested acknowledgements from a threshold percentage or number of recipient stations. Thus, the transmitter station may survey a portion or subset of all participating stations for receipt or acknowledgements, and use this acknowledgement data to make retransmission decisions for all (or one or more) recipient stations, for example.

Figure 7:
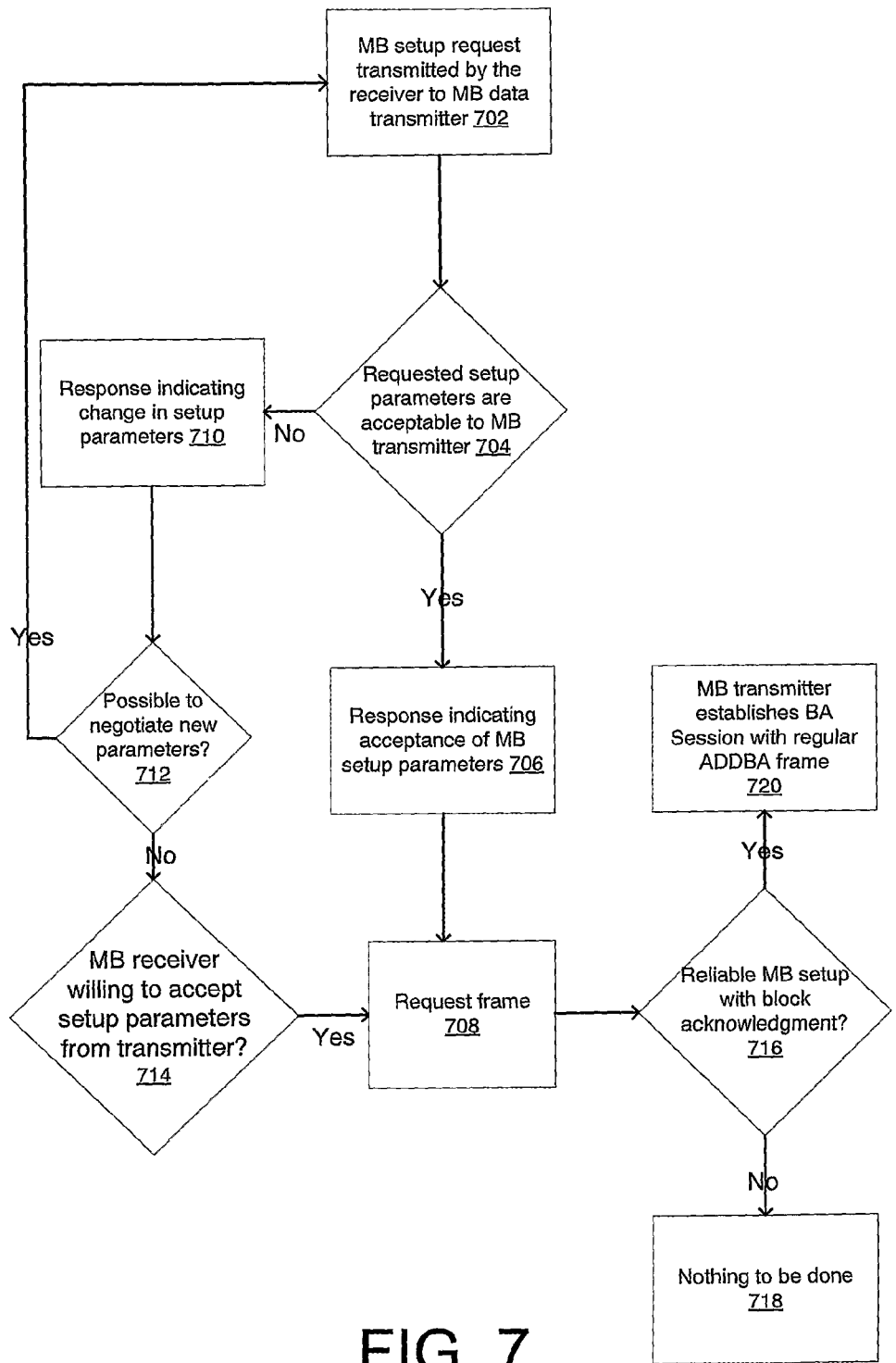
FIG. 7 is a flowchart illustrating operation according to an example embodiment.

FIG. 7 is a flowchart illustrating operation according to an example embodiment. According to this example, at block 702, the wireless recipient station 106 may transmit a multicast/broadcast setup request to the wireless transmitter station 104. The operation may proceed from block 702 to block 704, at which wireless transmitter station 104 may determine whether the multicast/broadcast setup parameters requested by the wireless recipient station 106 are acceptable to the wireless transmitter station 104. If the requested setup parameters are acceptable, then the operation may proceed to block 706. If the requested parameters are not acceptable, then the operation may proceed to block 710.

At block 706, the wireless transmitter station 104 may send to the wireless recipient station 106 a response indicating acceptance of the multicast/broadcast setup parameters. The operation may proceed from block 706 to block 708. At block 708, the wireless recipient station 104 may send to the wireless transmitter station 106 a request frame. The operation may proceed from block 708 to block 716.

At block 716, the wireless transmitter station 104 may determine whether a reliable multicast/broadcast session may be set up with block acknowledgment. If the reliable multicast/broadcast session may not be set up with block acknowledgment, then the operation proceeds to block 718, at which there is nothing to be done. If the reliable multicast/broadcast session may be set up, then the operation proceeds from block 716 to block 720, where the wireless transmitter station 104 establishes a reliable multicast/broadcast session with block acknowledgment by sending an add block acknowledgment frame to the wireless recipient station 106.

At block 710, the wireless transmitter station 104 sends to the wireless recipient station 106 a response indicating a change in the setup parameters, and the operation proceeds from block 710 to block 712. At block 712, the wireless transmitter station 104 determines whether it is possible to negotiate new parameters for the reliable multicast/broadcast session. If it is possible to negotiate new parameters, then the operation proceeds from block 712 to block 702. If it is not possible to negotiate new parameters, then the operation proceeds from block 712 to block 714.

At block 714, the wireless recipient station 106 determines whether the wireless recipient station 106 is willing to accept the setup parameters from the wireless transmitter station 104. If the wireless recipient station 106 determines that the wireless recipient station 106 is not willing to accept the setup parameters from the wireless transmitter station 104, then the operation ends, and a reliable multicast/broadcast station is not established. If the wireless recipient station 106 determines that the wireless recipient station is willing to accept the setup parameters from the wireless transmitter station 104, then the operation proceeds from block 714 to block 708.

Figure 8:
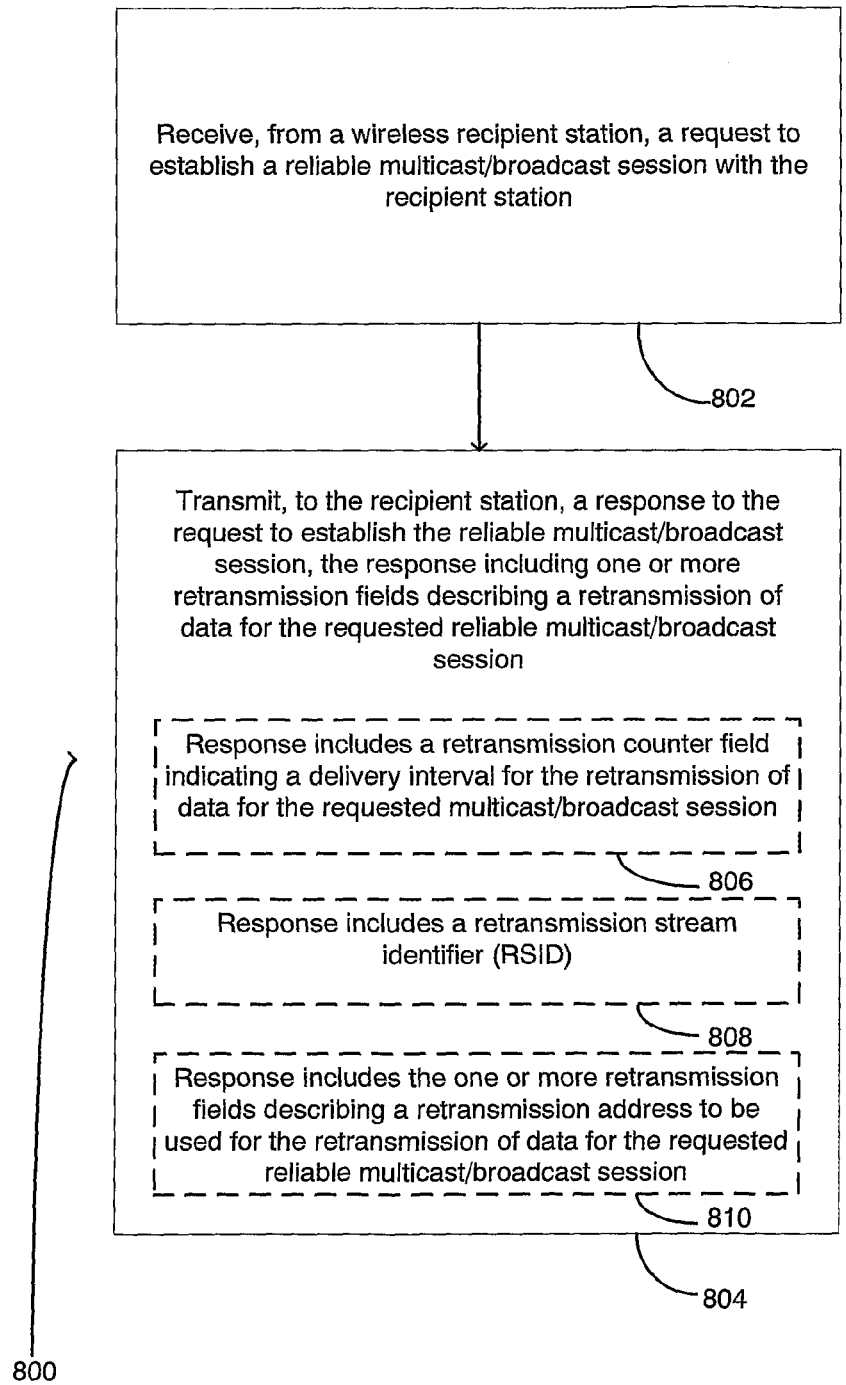
FIG. 8 is a flowchart illustrating a method of operation according to another example embodiment.

FIG. 8 is a flowchart illustrating a method 800 of operation according to another example embodiment. The method 800 may include receiving, from a wireless recipient station 106, a request to establish a reliable multicast/broadcast session with the wireless recipient station (802).

In an example embodiment, the request may include a field requesting or indicating limitations on the retransmission of data to the recipient station for the requested reliable multicast/broadcast session. In another example embodiment, the request may include a retry counter field requesting a maximum number of retries for the retransmission of data for the requested reliable multicast/broadcast session. In another example embodiment, the request may include a retry counter field requesting a maximum time limit for the retransmission of data for the requested reliable multicast/broadcast session. In yet another example embodiment, the request may include a field requesting a frequency, or delivery interval, for the retransmission of data for the requested reliable multicast/broadcast session.

In another example embodiment, the request may include a request to receive, as a unicast transmission to the wireless recipient station 106, data associated with the reliable multicast/broadcast session. The transmitting (described below) may include a response indicating that the data for the reliable multicast/broadcast session will be transmitted to the wireless recipient station 106 as unicast data.

In another example embodiment, the request may include a field indicating presence of other fields in the request relating to reliable multicast/broadcast. In another example embodiment, the request may include a multicast group address for the requested reliable multicast/broadcast session, a requested delivery interval for the session, an indication of support or not for block acknowledgments, and a field indicating a requested delivery interval for retransmission of data for the requested session.

The method 800 may further include transmitting, to the wireless recipient station 106, a response to the request to establish the reliable multicast/broadcast session, the response including one or more retransmission fields describing a retransmission of data for the requested reliable multicast/broadcast session (804). In an example embodiment, the response may include a retransmission counter field indicating a delivery interval for the retransmission of data for the requested multicast/broadcast session (806). In another example embodiment, the response may include a retransmission stream identifier (RSID) (808). The RSID may be included in a beacon frame to indicate an expected retransmission of data for the requested multicast/broadcast session. In another example embodiment, the response may include the one or more transmission fields describing a retransmission address to be used for the retransmission of data for the requested reliable multicast/broadcast session (810).

In an example embodiment, the response may include a field indicating whether the wireless transmitter station 104 is willing to negotiate the retransmission of data with the recipient station or one or more parameters relating to retransmission of data.

In another example embodiment, the transmitting may include a request to use block acknowledgments for the requested reliable multicast/broadcast session.

In an example embodiment, the response may include a multicast address to be used for transmission of data to the recipient station for the reliable multicast/broadcast session, and a retransmission multicast address to be used for retransmission of data to the recipient station for the reliable multicast/broadcast session. The multicast address and the retransmission address may either be different addresses or the same address.

In an example embodiment, the request to establish a reliable multicast/broadcast session may be received from each of a plurality of recipient stations, and a response may be transmitted to reach of the plurality of recipient stations, with each of the responses including one or more retransmission fields describing a retransmission of data for the requested reliable multicast/broadcast session.

In an example embodiment, the method 800 may further include transmitting data for the multicast/broadcast session using a first multicast address to one or more stations including the wireless recipient station 106, and retransmitting data of the multicast/broadcast session using a second multicast address to the recipient station; the second multicast address may or may not be different than the first multicast address. The retransmitting may comprise retransmitting a packet of the multicast/broadcast session using the second multicast address to the wireless recipient station 106 based on a failure to receive an acknowledgment from the wireless recipient station for the packet.

Figure 9:
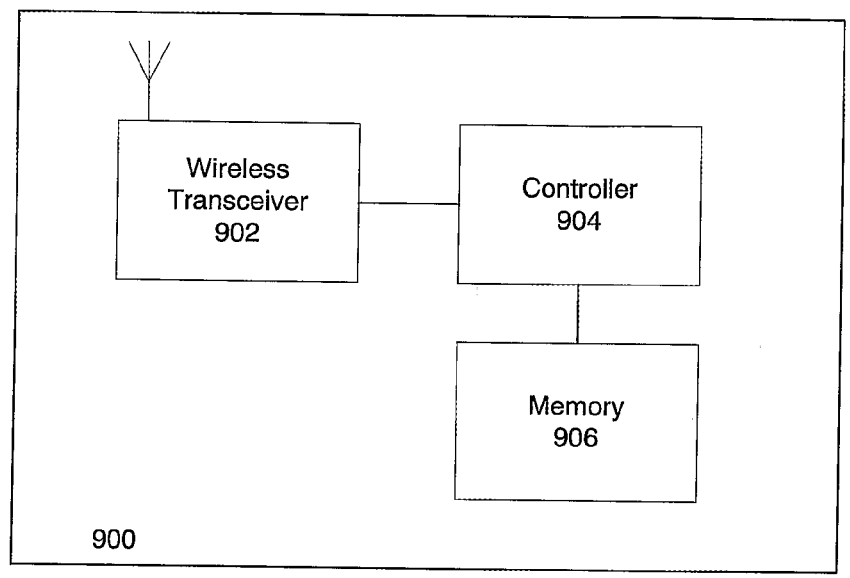
FIG. 9 is a block diagram illustrating an apparatus that may be provided in a wireless node according to an example embodiment.

FIG. 9 is a block diagram illustrating an apparatus 900 that may be provided in a wireless node according to an example embodiment. The wireless node (e.g. station or AP) may include, for example, a wireless transceiver 902 to transmit and receive signals, a controller 904 to control operation of the station and execute instructions or software, and a memory 906 to store data and/or instructions.

Controller (or processor) 904 may be programmable and capable of executing software or other instructions stored in memory or on other computer media to perform the various tasks and functions described above.

In addition, a storage medium may be provided that includes stored instructions, when executed by a controller or processor that may result in the controller 904, or other controller or processor, performing one or more of the functions or tasks described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

While certain features of the described implementations have been illustrated as described herein, many modifications, substitutions, changes and equivalents will now occur to those skilled in the art.

I claim:

1. A method, comprising:
   receiving, from a wireless recipient station, a request to establish a reliable multicast/broadcast session with the recipient station; and
   transmitting, to the recipient station, a response to the request to establish the reliable multicast/broadcast session;
   wherein the request includes a field indicating whether the station requests to receive data associated with the reliable multicast/broadcast session as unicast data; and
   wherein the response includes a field indicating whether the data for the reliable multicast/broadcast session will be transmitted to the wireless recipient station as unicast data.

2. The method of claim 1, wherein at least one of:
   the request includes a field indicating a presence of other fields in the request relating to reliable multicast/broadcast session; and the response includes one or more retransmission fields describing a retransmission of data for the requested reliable multicast/broadcast session.

3. The method of claim 1, wherein
transmitting the response comprises transmitting, to the recipient station, a response to the request to establish the reliable multicast/broadcast session, the response including:
a multicast address to be used for transmission of data to the recipient station for the reliable multicast/broadcast session, and
a retransmission multicast address to be used for retransmission of data to the recipient station for the reliable multicast/broadcast session.

4. The method of claim 3, wherein
the multicast address and the retransmission multicast address are different addresses.

5. The method of claim 1, wherein
receiving the request includes receiving the request to establish the reliable multicast/broadcast session with the recipient station, the request including at least one of:
a retry counter field requesting at least one of: a maximum number of retries for the retransmission of data for the requested reliable multicast/broadcast session, and a maximum time limit for the retransmission of data for the requested reliable multicast/broadcast session;
a field requesting or indicating limitations on the retransmission of data to the recipient station for the requested reliable multicast/broadcast session; and
a field requesting a frequency, or delivery interval, for the retransmission of data for the requested reliable multicast/broadcast session.

6. The method of claim 1, wherein
transmitting the response includes transmitting the response including at least one of a retransmission counter field indicating a delivery interval for the retransmission of data for the requested reliable multicast/broadcast session, and a retransmission stream identifier, to be included in a beacon frame, to indicate an expected retransmission of data for the requested multicast/broadcast session.

7. The method of claim 1, wherein
the transmitting the response includes transmitting the response including the one or more retransmission fields describing a retransmission address to be used for the retransmission of data for the requested reliable multicast/broadcast session.

8. The method of claim 1, further comprising
transmitting to the recipient station a request to use block acknowledgements for the requested reliable multicast/broadcast session.

9. The method of claim 1, further comprising:
transmitting data of the multicast/broadcast session using a first multicast address to one or more stations including the recipient station; and
retransmitting data of the multicast/broadcast session using a second multicast address to the recipient station.

10. The method of claim 1, further comprising:
transmitting data of the multicast/broadcast session using a first multicast address to one or more stations including the recipient station;
determining that an acknowledgement from one or more of the recipient stations has not been received; and
retransmitting, based on the determining, data of the multicast/broadcast session using a second multicast address.

11. A method, comprising:
transmitting, by a wireless recipient station, a request to establish a reliable multicast/broadcast session with the recipient station; and
receiving a response to the request to establish the reliable multicast/broadcast session,
wherein the request includes a field indicating whether the station requests to receive data associated with the reliable multicast/broadcast session as unicast data, and
wherein the response includes a field indicating whether the data for the reliable multicast/broadcast session will be transmitted to the station as unicast data.

12. The method of claim 11, wherein at least one of:
the request includes a field indicating a presence of other fields in the request relating to reliable multicast/broadcast session; and
the response includes one or more retransmission fields describing a retransmission of data for the requested reliable multicast/broadcast session.

13. An apparatus, comprising at least one processor and a memory storing computer program code, wherein the memory and stored computer program code are configured, with the at least one processor, to cause the apparatus to at least:
receive, from a wireless recipient station, a request to establish a reliable multicast/broadcast session with the recipient station; and
transmit, to the recipient station, a response to the request to establish the reliable multicast/broadcast session;
wherein the request includes a field indicating whether the station requests to receive data associated with the reliable multicast/broadcast session as unicast data; and
wherein the response includes a field indicating whether the data for the reliable multicast/broadcast session will be transmitted to the wireless recipient station as unicast data.

14. The apparatus of claim 13, wherein at least one of:
the request includes a field indicating a presence of other fields in the request relating to reliable multicast/broadcast session; and
the response includes one or more retransmission fields describing a retransmission of data for the requested reliable multicast/broadcast session.

15. The apparatus of claim 13, wherein
receiving the request comprises receiving, from the wireless recipient station, a request to receive, as a unicast transmission to the recipient station, data associated with the reliable multicast/broadcast session.

16. The apparatus of claim 13, wherein
transmitting the response to the request comprises transmitting, to the recipient station, a response indicating that the data for the reliable multicast/broadcast session will be transmitted to the recipient station as unicast data.

17. An apparatus, comprising at least one processor and a memory storing computer program code, wherein the memory and stored computer program code are configured, with the at least one processor, to cause the apparatus to at least:
transmit a request to establish a reliable multicast/broadcast session with a recipient station; and
receive a response to the recipient station to establish the reliable multicast/broadcast session;

wherein the request includes a field indicating whether the apparatus requests to receive data associated with the reliable multicast/broadcast session as unicast data, and wherein the response includes a field indicating whether the data for the reliable multicast/broadcast session will be transmitted to the apparatus as unicast data.

18. The apparatus of claim 17, wherein at least one of:

the request includes a field indicating a presence of other fields in the request relating to reliable multicast/broadcast session; and the response includes one or more retransmission fields describing a retransmission of data for the requested reliable multicast/broadcast session.

19. The apparatus of claim 17, wherein transmitting the request comprises transmitting, by the apparatus, a request to receive, as a unicast transmission to the apparatus, data associated with the reliable multicast/broadcast session.

20. The apparatus of claim 17, wherein receiving the response to the request comprises receiving, by the apparatus, a response indicating that the data for the reliable multicast/broadcast session will be transmitted to the apparatus as unicast data.

* * * * *